United States Patent
Hikita et al.

(10) Patent No.: US 11,870,956 B2
(45) Date of Patent: Jan. 9, 2024

(54) IMAGE FORMING APPARATUS

(71) Applicant: TOSHIBA TEC KABUSHIKI KAISHA, Tokyo (JP)

(72) Inventors: Haru Hikita, Sunto Shizuoka (JP); Sou Miyazaki, Sunto Shizuoka (JP); Hiroyo Tanaka, Koto Tokyo (JP); Kazuhiro Ogura, Hiratsuka Kanagawa (JP); Satoshi Oyama, Mishima Shizuoka (JP); Tatsuya Inagi, Izu Shizuoka (JP); Masaki Narahashi, Shinagawa Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/953,280

(22) Filed: Sep. 26, 2022

(65) Prior Publication Data
US 2023/0018633 A1    Jan. 19, 2023

Related U.S. Application Data

(63) Continuation of application No. 17/215,317, filed on Mar. 29, 2021, now Pat. No. 11,582,358.

(51) Int. Cl.
*H04N 1/00* (2006.01)
*G06V 10/25* (2022.01)
(Continued)

(52) U.S. Cl.
CPC ....... *H04N 1/00381* (2013.01); *G06F 3/0354* (2013.01); *G06F 3/04842* (2013.01);
(Continued)

(58) Field of Classification Search
CPC ........... H04N 1/00381; H04N 1/00005; H04N 1/00037; G06V 10/25; G06F 3/0354; G06F 3/04842
See application file for complete search history.

(56) References Cited

U.S. PATENT DOCUMENTS

| 7,106,467 B2 | 9/2006 | Takahashi |
| 2002/0036784 A1 | 3/2002 | Takagi |

(Continued)

FOREIGN PATENT DOCUMENTS

| JP | 2016-118941 A | 6/2016 |
| JP | 2020-048117 A | 3/2020 |

OTHER PUBLICATIONS

Notice of Allowance on U.S. Appl. No. 17/215,317 dated Oct. 11, 2022.

(Continued)

*Primary Examiner* — Stephen G Sherman
(74) *Attorney, Agent, or Firm* — FOLEY & LARDNER LLP

(57) ABSTRACT

An image forming apparatus includes a display device, an input device, a storage, and a communication circuit. The display device is configured to display at least one image for display. The input device is configured to detect a user's selection of an image for display in the at least one image for display and to detect an input, to a drawing region of the display device, of a drawing by a user indicating an image quality abnormality with respect to a target image corresponding to the selected image for display. The storage is configured to store drawing information based on the input of the drawing via the input device and to store estimation abnormality information related to the drawing information. The communication circuit is configured to output the drawing information, which can be used for servicing the image forming apparatus, to a server.

19 Claims, 5 Drawing Sheets

(51) Int. Cl.
*G06F 3/04842* (2022.01)
*G06F 3/0354* (2013.01)

(52) U.S. Cl.
CPC ......... *G06V 10/25* (2022.01); *H04N 1/00005* (2013.01); *H04N 1/00037* (2013.01)

(56) References Cited

U.S. PATENT DOCUMENTS

2016/0142560 A1  5/2016  Shijoh
2018/0260961 A1  9/2018  Narita

OTHER PUBLICATIONS

Final Office Action on U.S. Appl. No. 17/215,317 dated Jul. 25, 2022.
Non-Final Office Action on U.S. Appl. No. 17/215,317 dated Mar. 8, 2022.

IMAGE FORMING APPARATUS

CROSS-REFERENCE TO RELATED APPLICATION

This application is a continuation of U.S. application Ser. No. 17/215,317, filed Mar. 29, 2021, the entire contents of which are incorporated herein by reference.

FIELD

Embodiments described herein relate to an image forming apparatus.

BACKGROUND

When an image quality abnormality occurs in an image forming apparatus, it is difficult for a user to specify the type of image quality abnormality. As a method for specifying the type of image quality abnormality, an image forming apparatus that inputs the type of image quality abnormality and positional information regarding the occurrence of the image quality abnormality to a user is used. There is used an image forming apparatus that scans an image in which an image quality abnormality occurs, causes a user to designate a region in which the image quality abnormality occurs, prints a test chart selected from features of an image of the region, and uses the test chart for the specification of the image quality abnormality.

It may not be preferable, however, in terms of security to transmit information of an original image in which an image quality abnormality occurs to the outside such as a service man.

DETAILED DESCRIPTION

Figure 1:
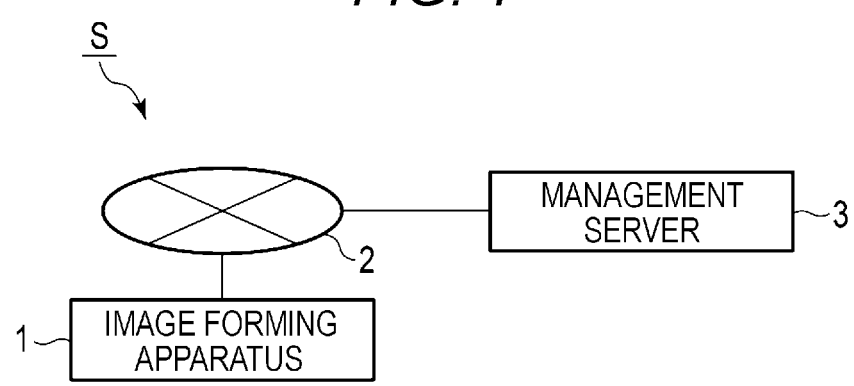
FIG. 1 is a block diagram illustrating an image quality abnormality specification system according to at least one embodiment.

In general, according to at least one embodiment, an image forming apparatus includes a display device (display), an input device (interface), a storage, and a communication circuit (communicator). The display device is configured to display at least one image for display. The input device is configured to detect a user's selection of an image for display in the at least one image for display and to detect an input, to a drawing region of the display device, of a drawing by a user indicating an image quality abnormality with respect to a target image corresponding to the selected image for display. The storage is configured to store drawing information based on the input of the drawing detected via the input device and to store estimation abnormality information related to the drawing information. The communication circuit is configured to output the drawing information, which can be used for servicing the image forming apparatus, to a server.

Hereinafter, at least one embodiment will be described using the drawings.

FIG. 1 is a block diagram illustrating an image quality abnormality specification system S according to the embodiment.

The image quality abnormality specification system S includes an image forming apparatus 1 and a management server 3. The image forming apparatus 1 and the management server 3 are communicatively connected to each other in a wired or wireless manner through a network 2. For example, the network 2 is the Internet.

The image forming apparatus 1 is an apparatus having an electrophotographic printing function. In at least one embodiment, description will be given on the assumption that the image forming apparatus 1 is a digital multifunction peripheral (MFP) having a copying function, a printing function, a facsimile function, a scanner function, and the like. A configuration example of the image forming apparatus 1 will be described later.

The management server 3 is an apparatus capable of communicating with other equipment. The management server 3 collects data processed by the image forming apparatus 1 through the network 2, appropriately processes the data, and stores the data in a data file. The management server 3 communicates with equipment used by a service man who performs maintenance work on the image forming apparatus 1 in accordance with various information received from the image forming apparatus 1. The maintenance work includes work such as repair and maintenance of each unit of the image forming apparatus 1.

Figure 2:
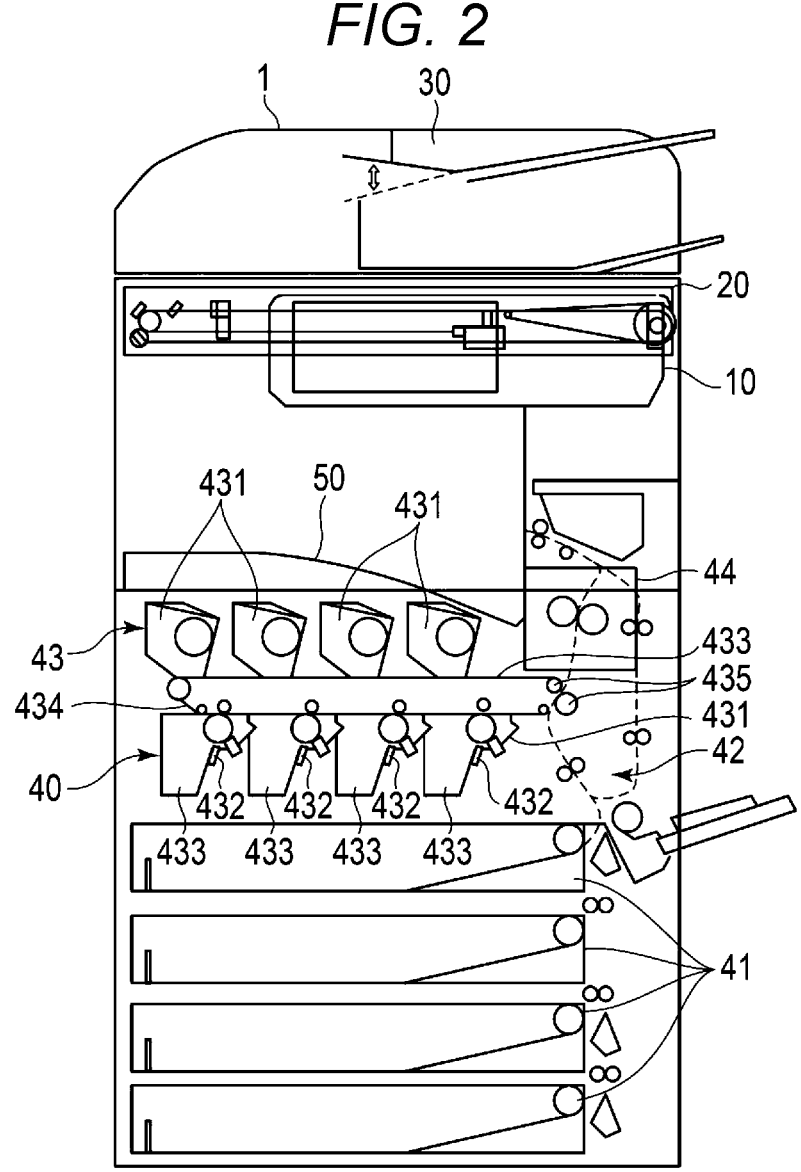
FIG. 2 is a schematic diagram illustrating a configuration example of an image forming apparatus according to at least one embodiment.

FIG. 2 is a schematic diagram of a configuration example of the image forming apparatus 1.

The image forming apparatus 1 includes a control panel 10, a scanner unit 20, an automatic document feeding apparatus 30, a printer unit 40, and a paper discharge tray 50.

The control panel 10 includes a display device that displays various screens. The control panel 10 includes an input device for inputting an instruction based on an operator's operation. Meanwhile, the operator may be reread as a user or a person.

The scanner unit 20 is an apparatus that reads an image from a medium such as a document. For example, the medium may be paper, but is not limited thereto. The scanner unit 20 includes a line sensor. The line sensor may adopt a charge coupled device (CCD) system. The line sensor may adopt a contact image sensor (CIS) system. The line sensor may adopt other systems. The scanner unit 20 generates image data based on an image read using the line sensor.

The automatic document feeding apparatus 30 is an apparatus that conveys a medium such as a document to a reading position of the scanner unit 20. The automatic document feeding apparatus 30 includes a tray on which mediums are placed. The automatic document feeding apparatus 30 conveys the mediums placed on the tray to a reading position of the scanner unit 20 one by one.

The printer unit 40 is an apparatus that forms an image on a medium by fixing a toner image transferred to the medium. The printer unit 40 may form an image on a medium on the basis of image data generated by the scanner unit 20. The printer unit 40 may form an image on a medium on the basis of image data received from another apparatus such as a personal computer by the image forming apparatus 1.

The paper discharge tray 50 is a tray on which a medium having an image formed thereon by the printer unit 40 is placed, the medium being discharged from the printer unit 40.

The printer unit 40 includes an accommodation unit 41, a conveyance unit 42, an image forming unit 43, and a fixing unit 44.

The accommodation unit 41 is a component that accommodates mediums. The accommodation unit 41 includes a plurality of paper feeding cassettes. Each of the paper feeding cassettes accommodates mediums of a predetermined size and type. Each of the paper feeding cassettes includes a pickup roller. The pickup roller picks up mediums one by one from the paper feeding cassette. The pickup roller supplies the picked-up mediums to the conveyance unit 42.

The conveyance unit 42 includes a plurality of rollers that convey mediums inside the image forming apparatus 1, a plurality of paper feeding guides, and the like. The conveyance unit 42 conveys mediums supplied from the accommodation unit 41 to the image forming unit 43 and the fixing unit 44 in order. The conveyance unit 42 conveys a medium on which an image passing through the fixing unit 44 is formed to the paper discharge tray 50.

The image forming unit 43 is a component that forms a toner image on a medium. The image forming unit 43 includes a plurality of toner cartridges 431, a plurality of developing units 432, a plurality of exposing units 433, an intermediate transfer belt 434, and a transfer unit 435.

Each of the plurality of toner cartridges 431 is a component that stores a toner. The plurality of toner cartridges 431 are a plurality of toner cartridges that store toners of respective colors. The plurality of toner cartridges 431 may include a cyan toner cartridge, a magenta toner cartridge, a yellow toner cartridge, and a black toner cartridge. The plurality of toner cartridges 431 may include a toner cartridge of a decolorable toner for performing decoloring at a temperature higher than a predetermined temperature. The toner cartridges 431 supply toner to the respective developing units 432. When the image forming apparatus 1 is an apparatus that forms an image on a medium using a single color, the image forming unit 43 is configured to include one toner cartridge 431 instead of a plurality of toner cartridges 431.

Each of the plurality of developing units 432 is a component that multi-transfers toner images of respective colors on the surface of the intermediate transfer belt 434. The plurality of developing units 432 are a plurality of developing units corresponding to toners of respective colors. The plurality of developing units 432 include a cyan developing unit, a magenta developing unit, a yellow developing unit, and a black developing unit. The plurality of developing units 432 may include a developing unit for a decolorable toner. When the image forming apparatus 1 is an apparatus that forms an image on a medium using a single color, the image forming unit 43 is configured to include one developing unit 432 instead of the plurality of developing units 432.

Each of the developing units 432 includes a photoreceptor drum. Each of the developing units 432 includes a charger, a developing apparatus, a primary transfer roller, a cleaning unit, a static eliminator, and the like around the photoreceptor drum.

The photoreceptor drum is an image carrier that includes a photoreceptor layer on the surface thereof. The photoreceptor drum rotates about the axis.

The charger uniformly charges the photoreceptor layer on the surface of the photoreceptor drum. For example, the charger charges the surface of the photoreceptor drum in a negative polarity.

The developing apparatus develops an electrostatic latent image on the surface of the photoreceptor drum using a toner supplied from the toner cartridge 431. That is, the developing apparatus attaches the toner to the electrostatic latent image on the photoreceptor drum to form a toner image on the surface of the photoreceptor drum.

The primary transfer roller is located at a position facing the photoreceptor drum with the intermediate transfer belt 434 interposed therebetween. The primary transfer roller transfers the toner image on the surface of the photoreceptor drum to the surface of the intermediate transfer belt 434. The transfer of the toner image from the photoreceptor drum to the intermediate transfer belt 434 by the primary transfer roller is also referred to as primary transfer.

The cleaning unit is located in the rear stage of a position where the toner image on the surface of the photoreceptor drum is transferred to the surface of the intermediate transfer belt 434. The cleaning unit scrapes off and removes a toner on the surface of the photoreceptor drum which is not transferred to the surface of the intermediate transfer belt 434, and the like.

The static eliminator is located at a position facing the photoreceptor drum that passes through the cleaning unit. The static eliminator irradiates the surface of the photoreceptor drum with light to eliminate static electricity of the photoreceptor layer of the photoreceptor drum. Charge of the photoreceptor layer of the photoreceptor drum becomes uniform.

Each of the plurality of exposing units 433 is a component that forms an electrostatic latent image on the surface of the photoreceptor drum of each of the developing units 432. Each of the exposing units 433 is positioned facing one of the developing units 432. Each of the exposing units 433 may include a semiconductor laser beam source. Each of the exposing units 433 irradiates the surface of the photoreceptor drum of each of the developing units 432 with a laser beam through an optical system such as a polygon mirror. Each of the exposing units 433 forms a pattern of static electricity as an electrostatic latent image at the position of the surface of the photoreceptor drum irradiated with the laser beam. Each of the exposing units 433 may include a light emitting diode (LED) instead of the laser beam source. When the image forming apparatus 1 is an apparatus that forms an image on a medium using a single color, the image forming unit 43 is configured to include one exposing unit 433 instead of the plurality of exposing units 433.

The intermediate transfer belt 434 is an endless belt. The intermediate transfer belt 434 is rotatable in correlation with the movement of a roller. The intermediate transfer belt 434 passes between the photoreceptor drums of the respective developing units 432 and the primary transfer roller.

The transfer unit 435 is a component that transfers a toner image charged on the surface of the intermediate transfer belt 434 to a medium. The transfer of the toner image to the medium from the intermediate transfer belt 434 by the transfer unit 435 is also referred to as secondary transfer. The transfer unit 435 includes a supporting roller and a secondary transfer roller that face each other. The supporting roller and the secondary transfer roller are configured to sandwich the intermediate transfer belt 434 and the medium from both sides in a thickness direction. The supporting roller is a roller that drives the intermediate transfer belt 434.

The fixing unit 44 is a fixer that performs heating and pressing on a medium having a toner image transferred thereto to fix the toner image onto the medium. The fixing unit 44 includes a heat roller and a pressure roller that face each other. The heat roller is a roller that includes a heat source. For example, the heat source may be a heater. The heat roller heats a medium having a toner image transferred thereto. The pressure roller presses a medium to which a toner image passing between the pressure roller and the heat roller is transferred.

Figure 3:
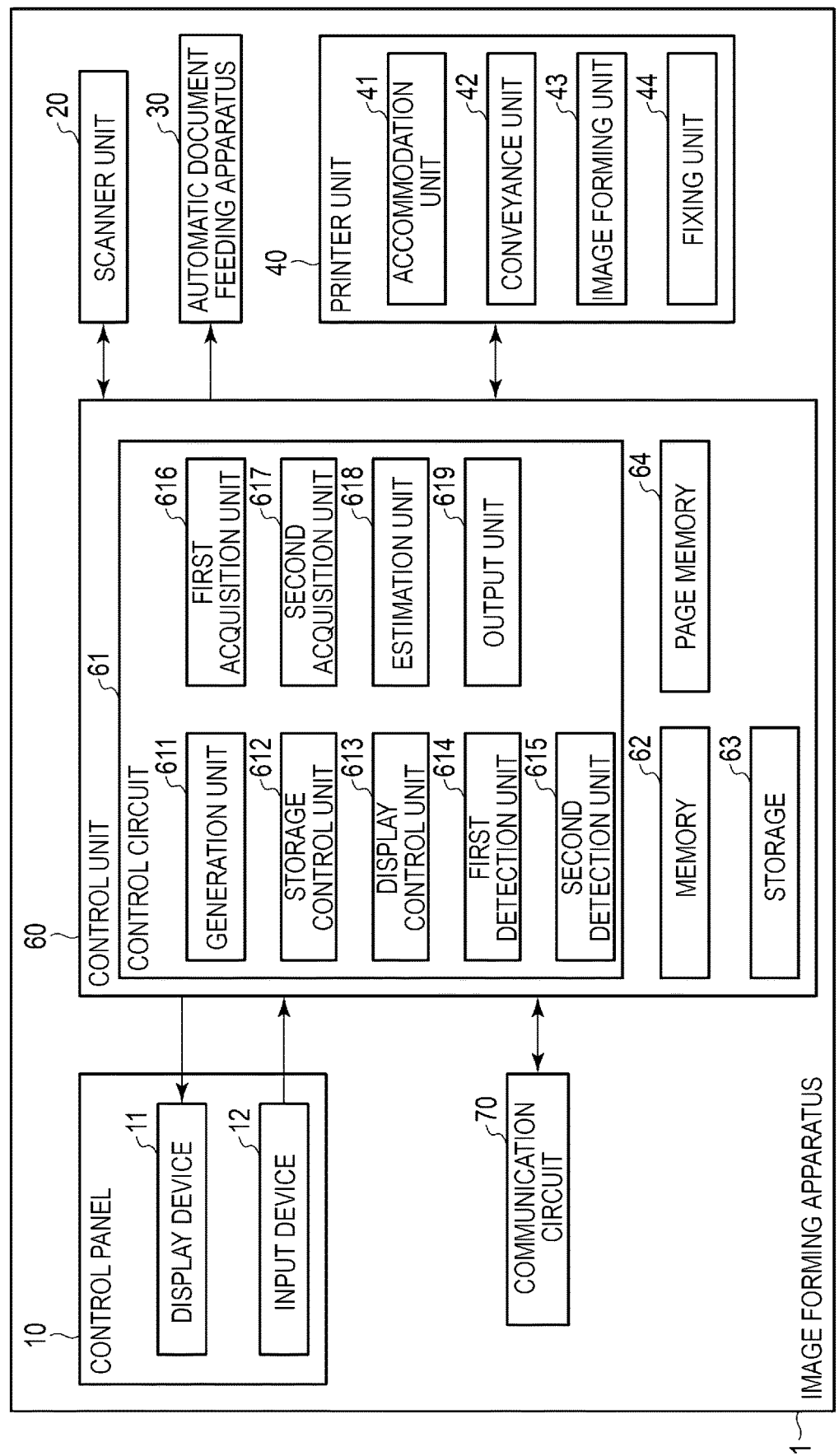
FIG. 3 is a schematic block diagram illustrating a configuration example of the image forming apparatus.

FIG. 3 is a schematic block diagram illustrating a configuration example of the image forming apparatus 1.

The image forming apparatus 1 includes a control unit 60 and a communication circuit 70, in addition to the control panel 10, the scanner unit 20, the automatic document feeding apparatus 30, and the printer unit 40 described above.

The control panel 10 includes a display device 11 and an input device 12.

The display device 11 may be a liquid crystal display, an organic electroluminescence (EL) display, or the like. The display device 11 displays information such as the state of the image forming apparatus 1 and various settings. In addition, the display device 11 displays options for changing the setting and the like of the image forming apparatus 1, and the like. The display device 11 is an example of a display unit.

The input device 12 may be a touch panel, a hardware key, or the like. The touch panel is configured by laminating the display device 11 and the input device 12. The input device 12 acquires an operator's instruction. The input device 12 is an example of an input unit.

The control unit 60 constitutes a computer that controls operations of the respective units of the image forming apparatus 1.

The control unit 60 includes a control circuit 61, a memory 62, a storage 63, and a page memory 64.

The control circuit 61 is equivalent to a central portion of a computer. For example, the control circuit 61 is a circuit including a processor such as a central processing unit (CPU). The control circuit 61 may include an application specific integrated circuit (ASIC), a field programmable gate array (FPGA), a graphics processing unit (GPU), and the like, instead of, or in addition to, the CPU. The control circuit 61 loads programs stored in the storage 63 or the like in the memory 62. The control circuit 61 executes various operations by executing the programs loaded in the memory 62. The programs are programs causing the control circuit 61 to realize units to be described later.

The memory 62 includes a read only memory (ROM) and a random access memory (RAM). The ROM is equivalent to a main storage apparatus of a computer centered on the control circuit 61. The ROM is a non-volatile memory. The ROM stores data, various setting values, and the like that are used when the control circuit 61 performs various processes. The RAM is equivalent to a main storage apparatus of a computer centered on the control circuit 61. The RAM is a memory used for reading and writing of data. The RAM is a work area for storing data which is temporarily used when the control circuit 61 performs various processes.

The storage 63 is equivalent to an auxiliary storage apparatus of a computer centered on the control circuit 61. For example, the storage 63 is an electric erasable programmable read-only memory (EEPROM) (registered trademark), a hard disk drive (HDD), a solid state drive (SSD), or the like. The storage 63 stores the above-described programs. The storage 63 stores data which is used when the control circuit 61 performs various processes. Image data to be printed may be recorded in the storage 63. The storage 63 is an example of a storage unit.

The page memory 64 is a memory that includes a storage region in which image data for at least one page is loaded. The image data is transferred from the page memory 64 to the storage 63.

The communication circuit 70 is an interface allowing the image forming apparatus 1 to be capable of communicating with other apparatuses through the network 2. The communication circuit 70 is an example of a communication interface. The communication circuit 70 is an example of a communication unit.

Next, units mounted on the control circuit 61 will be described.

A generation unit 611, a storage control unit 612, a display control unit 613, a first detection unit 614, a second detection unit 615, a first acquisition unit 616, a second acquisition unit 617, an estimation unit 618, and an output unit 619 are mounted on the control circuit 61. The units mounted on the control circuit 61 can also be referred to as functions. The units mounted on the control circuit 61 may be mounted on the control unit 60 including the control circuit 61 and the memory 62.

The generation unit 611 generates feature information on image data of each job which is input to the image forming apparatus 1. The image data which is input to the image forming apparatus 1 is also referred to as input image data. The input image data may be image data which is generated by the scanner unit 20. The input image data may be image data received from other apparatuses, such as a personal computer, by the image forming apparatus 1. The input image data is used to form an image on a medium by the printer unit 40. Feature information on the input image data is feature information of each of one or more images based on input image data of each of one or more images included in each job.

The feature information may include information related to a toner color used to form an image and information related to the proportion of a character and line region. The information related to a toner color includes information indicating that an image is formed using single colors of yellow (Y), magenta (M), cyan (C), black (K), and white (W), secondary colors, and mixed colors of a secondary color or higher. In addition, the information related to a toner color includes a median, an average value, and color gamut information of a toner density of each color. The information related to a toner color may be generated on the basis of input image data. The information related to the proportion of a character and line region includes information indicating the proportion of characters and lines in the entire image corresponding to input image data. The feature information may include positional information indicating the position of objects such as characters and lines in an image corresponding to input image data. The feature information may be generated for each of two or more sub-regions obtained by dividing an image corresponding to input image data in a grid shape. Meanwhile, for example, the feature information may be generated using a known image feature extraction technique for input image data loaded in the page memory 64.

The storage control unit 612 stores various data by controlling the storage 63. For example, the storage control unit 612 stores feature information generated by the generation unit 611 in the storage 63 in correlation with the corresponding input image data. The storage 63 stores feature information. The storage control unit 612 updates the feature information stored in the storage 63 in accordance with the generation of the feature information by the generation unit 611.

The storage control unit 612 stores drawing information to be described later in the storage 63 in correlation with the corresponding input image data. The storage 63 stores the drawing information. The storage control unit 612 updates the drawing information stored in the storage 63 in accordance with the generation of the drawing information. The storage 63 updates feature information.

The storage control unit 612 stores setting information in the storage 63 in correlation with the corresponding input image data. The setting information is various information on the functions of the image forming apparatus 1 which are set at the time of image formation, such as a conveyance direction of a medium on which an image is formed, double-sided or single-sided printing, enlargement or reduction setting, and density setting. The setting information is equivalent to information related to the formation of an image. The storage 63 stores the setting information. The storage control unit 612 updates the setting information stored in the storage 63 in accordance with the generation of setting information.

The storage control unit 612 stores estimation abnormality information to be described later in the storage 63 in correlation with the corresponding input image data.

The display control unit 613 displays various images on the display device 11. For example, the display control unit 613 displays at least one image for display on the display device 11. The at least one image for display may be an image corresponding to one or more images based on input image data of one or more jobs. The image for display may be an image for displaying a thumbnail of an image based on input image data. When an image for display is selected by an operator, the display control unit 613 displays a screen for drawing, which is to be described later, for giving an instruction for an image quality abnormality on the display device 11. The image quality abnormality is an abnormality that occurs in an image formed by the image forming apparatus 1. The abnormality includes "streaks", "unevenness", "black spots", "white spots", "dirt", and the like. The screen refers to an image which is displayed on the display device 11.

The first detection unit 614 detects an operator's touch input on the display device 11 through the input device 12. The touch input is realized by the operator's touch on the screen in accordance with various images displayed on the display device 11. The screen on which an image is displayed includes buttons for designating operations. The operator designates an operation by touching the button displayed on the display device 11. The first detection unit 614 may detect an input through hardware keys provided in the input device 12.

The second detection unit 615 detects an operator's touch input on the display device 11 through the input device 12. The touch input is realized by an operator's touch on the screen in accordance with various images displayed on the display device 11. The screen on which an image is displayed includes buttons for designating operations and a drawing tool for drawing an image quality abnormality by an operator. The operator designates an operation by touching the displayed button. The operator selects the displayed drawing tool by a touch input and moves the drawing tool while touching a drawing region displayed on the display device 11. The second detection unit 615 detects the position and trajectory of the operator's touch on the drawing region. Thereby, the second detection unit 615 detects an input of drawing on the drawing region based on the drawing tool selected by the operator. The second detection unit 615 acquires drawing information based on drawing indicating one or more image quality abnormalities. The drawing information is information on the drawing indicating one or more image quality abnormalities input by the operator in the drawing region. For example, the drawing information is information indicating details of the drawing and the position of the drawing. The drawing information may be image information of the drawing. Meanwhile, the second detection unit 615 may detect an input through the hardware keys provided in the input device 12.

The first acquisition unit 616 acquires drawing information from the storage 63.

The second acquisition unit 617 acquires feature information from the storage 63. The second acquisition unit 617 acquires setting information from the storage 63. The second acquisition unit 617 acquires estimation abnormality information to be described later from the storage 63.

The estimation unit 618 generates estimation abnormality information on the basis of drawing information acquired by the first acquisition unit 616. The estimation abnormality information is information indicating the type of image quality abnormality estimated by the estimation unit 618. For example, the estimation unit 618 performs image recognition on an image generated on the basis of drawing information to estimate the type of image quality abnormality. Meanwhile, the estimation unit 618 may estimate the type of image quality abnormality using a known image recognition technique, for example. In addition, the estimation unit 618 may estimate the type of image quality abnormality on the basis of feature information and setting information acquired by the second acquisition unit 617, in addition to the drawing information.

The output unit 619 outputs various information to the management server 3 through the network 2. For example, the output unit 619 outputs drawing information acquired by the first acquisition unit 616 to the management server 3. The output unit 619 outputs feature information acquired by the second acquisition unit 617 to the management server 3. The output unit 619 outputs setting information acquired by the second acquisition unit 617 to the management server 3. The output unit 619 outputs estimation abnormality information estimated by the estimation unit 618 to the management server 3. The output includes transmission.

Next, an example of the screen displayed on the display device 11 will be described.

Figure 4:
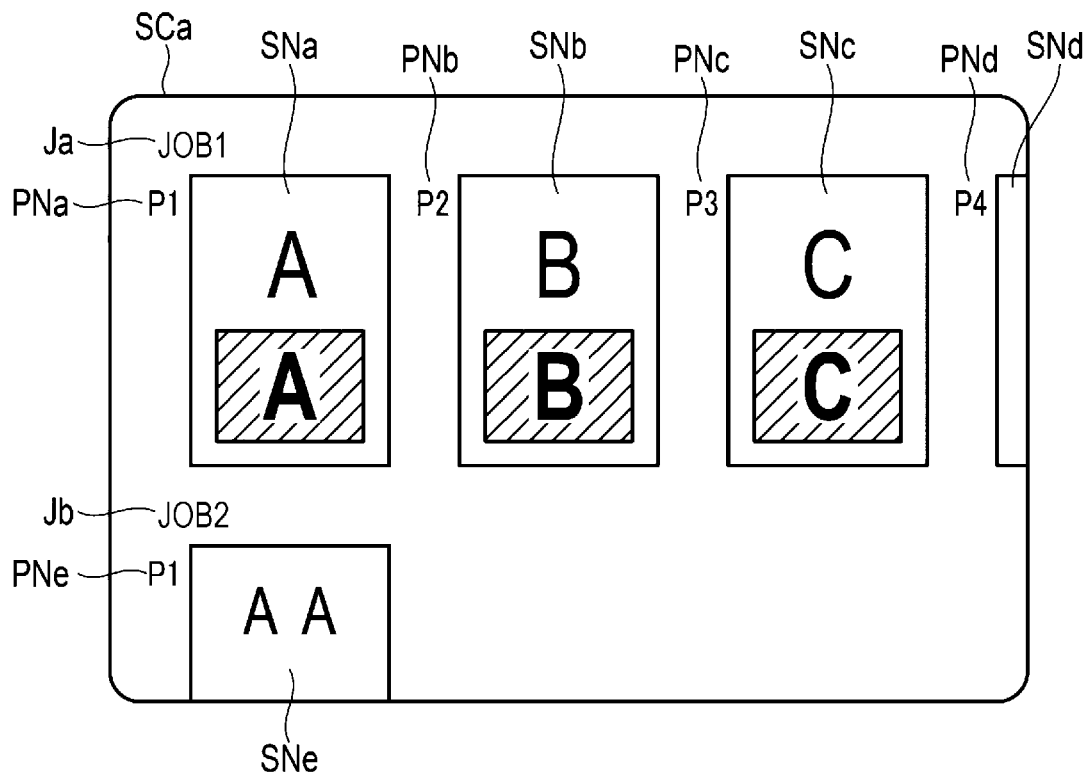
FIG. 4 is a diagram illustrating an example of a target image selection screen displayed on a display device of the image forming apparatus.

FIG. 4 is a diagram illustrating an example of a target image selection screen displayed on the display device 11 of the image forming apparatus 1 according to at least one embodiment.

The display device 11 displays a target image selection screen SCa on the basis of the start of image quality abnormality specification processing. The image quality abnormality specification processing is started in response to an input of a starting instruction through the input device 12. The starting instruction is an instruction for giving an instruction for starting image quality abnormality specification processing. For example, an operator may determine an image quality abnormality by viewing an image formed on a medium by the image forming apparatus 1, and inputs a starting instruction through the input device 12. The image quality abnormality specification processing may be started in response to the operator notifying a service man of the image quality abnormality. Hereinafter, "in response to" may be read as "on the basis of".

The target image selection screen SCa includes images for display SNa to SNe corresponding to a plurality of images based on input image data of a plurality of jobs. The display device 11 displays the images for display SNa to SNe in parallel for each job. The job represents basic processing (copying, printing, or the like) of the image forming apparatus 1. In at least one embodiment, for ease of description, a printing job is assumed and described. In addition, the target image selection screen SCa includes job names Ja and Jb for identifying respective jobs and page numbers PNa to PNe for each job.

The display device 11 may display the images for display SNa to SNe at an enlarged or reduced scale on the basis of an operator's operation. The display device 11 may display an operation guide for causing an operator to designate an image for display corresponding to an image in which an image quality abnormality occurs (hereinafter, also referred to as a target image). The display device 11 may display the operation guide as a moving image by using moving image data. Alternatively, the control panel 10 may output the operation guide as a sound by using sound data.

An operator selects an image for display corresponding to a target image and performs a touch input. The first detection unit 614 detects the operator's touch input to detect that the image for display is selected. The display device 11 displays a screen for drawing in response to the first detection unit 614 detecting the selection of the image for display.

Figure 5:
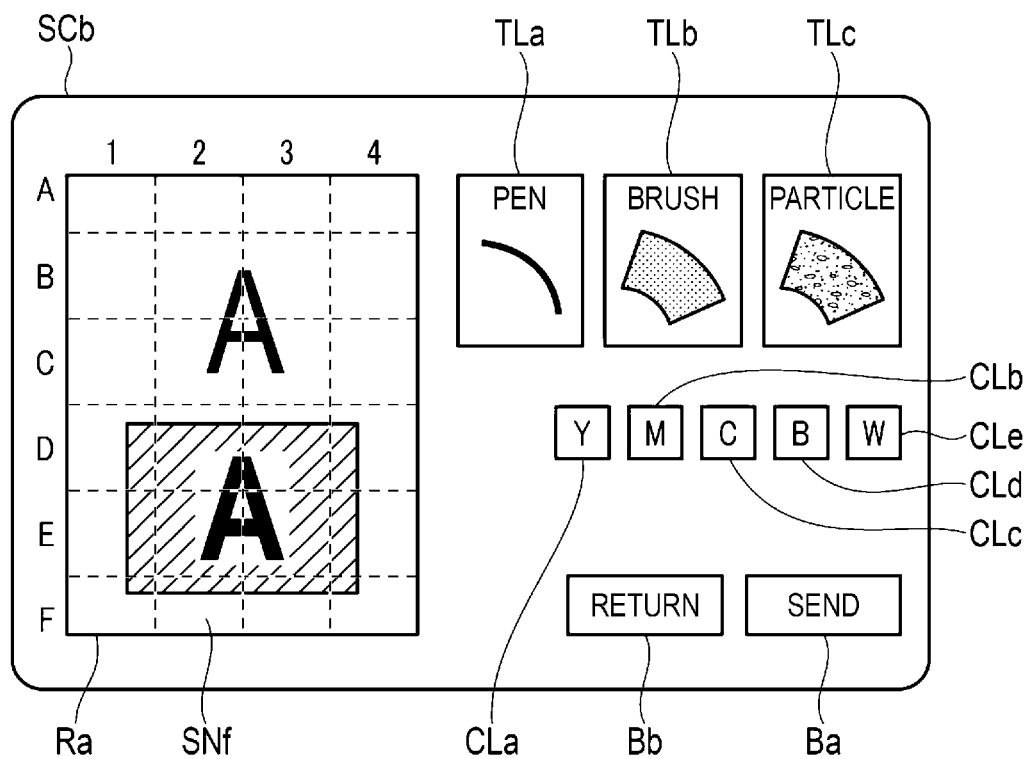
FIG. 5 is a diagram illustrating an example of a screen for drawing displayed on the display device.

FIG. 5 is a diagram illustrating an example of a screen for drawing displayed on the display device 11 of the image forming apparatus 1 according to at least one embodiment.

The display device 11 displays a screen for drawing SCb on the basis of an operator selecting an image for display corresponding to a target image. The screen for drawing SCb includes a drawing region Ra. The drawing region Ra is a region that receives drawing indicating an image quality abnormality through the operator's touch input on the display device 11.

The display device 11 may display an image for display SNf selected by an operator in the drawing region Ra. The operator can easily draw an image quality abnormality in the drawing region Ra using the image for display SNf as a guide while viewing a medium on which a target image corresponding to the image for display SNf is formed.

The display device 11 may display a grid on the drawing region Ra. The grid indicates two or more sub-regions obtained by dividing an image corresponding to the image for display SNf in a grid shape. The sub-region corresponds to a sub-region when feature information is generated by the generation unit 611. Numbers illustrated in FIG. 5 indicate the positions of sub-regions in a horizontal direction. Alphabets illustrated in FIG. 5 indicate the positions of sub-regions in a vertical direction. Hereinafter, the position of a sub-region may also be specified using a combination of a number and an alphabet.

The display device 11 may display the image for display SNf on the drawing region Ra at an enlarged or reduced scale on the basis of an operator's operation. In this case, the display device 11 may also display the grid on the drawing region Ra at an enlarged or reduced scale in accordance with the image for display SNf.

The display device 11 may display a plurality of drawing tools TLa to TLc for an operator to input drawing indicating an image quality abnormality. The drawing tools include at least one of a "pen" tool TLa, a "brush" tool TLb, or a "particle" tool TLc. The operator can select a drawing tool and draw an image quality abnormality in accordance with the type of image quality abnormality. For example, the operator can draw fine and opaque "black spots", "white spots", "streaks", and the like, by using the "pen" tool TLa. The operator can draw "streaks" and the like which are translucent and thicker than lines and the like by using the "brush" tool TLb. The operator can draw "dirt" and the like which are a plurality of fine points by using the "particle" tool TLc. The drawing tools are not limited to the above-described drawing tools, and may include a tool by which thickness, density, texture, and the like, can be selected.

The display device 11 further displays drawing color selection buttons CLa to CLe for an operator to designate the color of an image quality abnormality. The drawing color selection buttons CLa to CLe include at least one of yellow (Y), magenta (M), cyan (C), black (K), or white (W). The operator can draw an image quality abnormality by selecting the color of an image quality abnormality that occurs by means of the drawing color selection button.

The display device 11 further displays a "send" button Ba and a "return" button Bb. An operator touches the "send" button Ba when drawing is terminated. The operator's touch input of the "send" button Ba is an example of an output instruction for outputting drawing information to the management server 3. When the operator selects an image for display corresponding to another target image, the operator touches the "return" button Bb. The operator's touch input of the "return" button Bb is an example of a display instruction for displaying the target image selection screen SCa on the display device 11.

The operator may select a position where an image quality abnormality occurs on the basis of a grid displayed on the drawing region Ra, instead of, or in addition to, a touch input using the drawing tool. For example, when an image quality abnormality occurs in a sub-region (D2), the operator may touch and select the sub-region (D2).

The display device 11 may display an operation guide for an operator to draw an image quality abnormality. The operation guide may include an operation guide for recommending the selection of a drawing tool in accordance with an image quality abnormality that occurs. In addition, the operation guide may include an operation guide for recommending the selection of a drawing color in accordance with a toner color of an image quality abnormality that occurs. The display device 11 may display the operation guide as a moving image by using moving image data. Alternatively, the control panel 10 may output the operation guide as a sound by using sound data.

Next, a processing procedure of feature information generation in the image forming apparatus 1 will be described.

Figure 6:
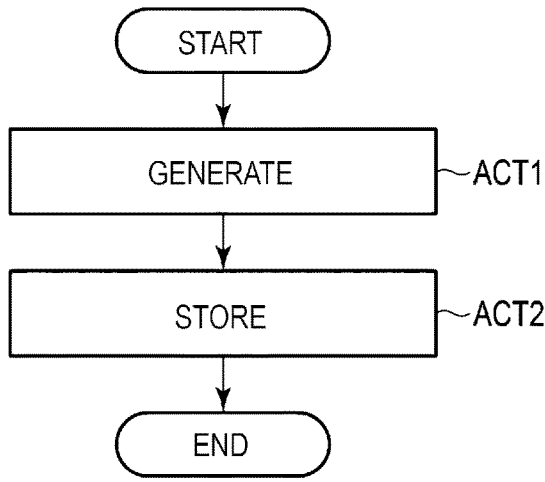
FIG. 6 is a flowchart illustrating a processing procedure of feature information generation in the image forming apparatus.

FIG. 6 is a flowchart illustrating a processing procedure of feature information generation in the image forming apparatus 1 according to at least one embodiment.

Meanwhile, a processing procedure to be described below is merely an example, and each processing may be changed as much as possible. In addition, the processing procedure to be described below can be appropriately subjected to omission, replacement, and addition of ACTs in accordance with an embodiment.

The processing procedure described below is a processing procedure for generating feature information on the basis of input image data when image data is input to the image forming apparatus 1 for each job.

The generation unit 611 generates feature information on image data (ACT1). In ACT1, for example, the generation unit 611 generates feature information of each of one or more images based on input image data of one job. The generation unit 611 may generate feature information for each of two or more sub-regions obtained by dividing each of one or more images based on input image data of one job in a grid shape. For example, feature information on a sub-region (D2) of a target image corresponding to the image for display SNf illustrated in FIG. 5 will be described. The generation unit 611 generates "blue-black, blue density 100%, black density 100%" as information related to a toner color, and generates "character and line 10%" as information related to the proportion of a character and line region.

The storage control unit 612 stores the feature information generated by the generation unit 611 in the storage 63 (ACT2). In ACT2, for example, the storage control unit 612 stores the feature information in the storage 63 in correlation with input image data. The storage control unit 612 stores feature information for each sub-region in the storage 63 in correlation with input image data. The storage control unit 612 updates the feature information stored in the storage 63 in accordance with the generation of the feature information by the generation unit 611.

Next, a processing procedure of image quality abnormality specification in the image forming apparatus 1 will be described.

Figure 7:
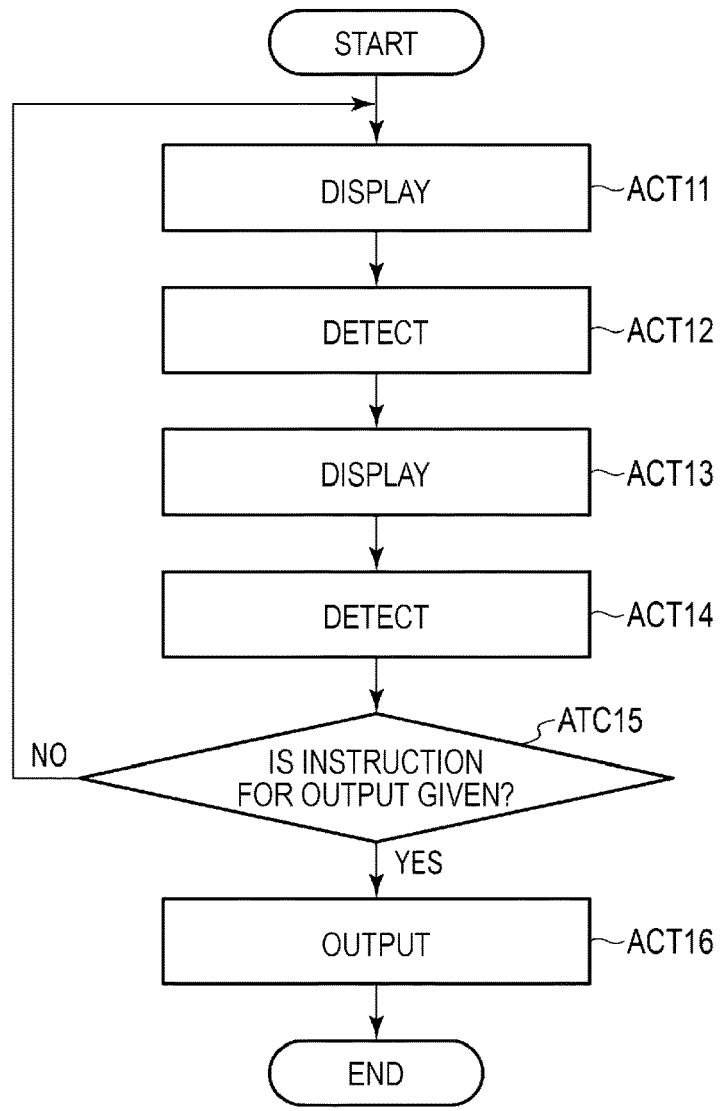
FIG. 7 is a flowchart illustrating a processing procedure of image quality abnormality specification in the image forming apparatus.

FIG. 7 is a flowchart illustrating a processing procedure of image quality abnormality specification in the image forming apparatus 1 according to at least one embodiment.

Meanwhile, the processing procedure described below is merely an example, and each processing may be changed as much as possible. In addition, the processing procedure to be described below can be appropriately subjected to omission, replacement, and addition of ACTs in accordance with an embodiment.

The processing procedure described below is a processing procedure for specifying an image quality abnormality with respect to an image formed by the image forming apparatus 1.

First, the following image quality abnormality specification processing is started in response to the input of a starting instruction through the input device 12. The image quality abnormality specification processing is not limited to an operator's input of a starting instruction and may be started by any means.

The display control unit 613 displays at least one image for display on the display device 11 (ACT11). In ACT11, for example, the display control unit 613 displays the target image selection screen SCa (see FIG. 4) on the display device 11. The display device 11 displays the target image selection screen SCa as an example in which at least one image for display is displayed, under the control of the display control unit 613. The display control unit 613 displays an image for display on the display device 11 for each job in an identifiable mode. The display control unit 613 may display a list of jobs on the display device 11. In this case, an operator can select one job from the list of jobs. The display control unit 613 may display one or more images for display corresponding to one or more images included in the selected job on the display device 11 in response to the selection of one job.

The first detection unit 614 detects the selection of an image for display in at least one image for display (ACT12). In ACT12, for example, the first detection unit 614 detects an operator's touch input of an image for display corresponding to a target image in the target image selection screen SCa. The first detection unit 614 detects that an image for display is touched in accordance with a signal transmitted from the display device 11. The detection of the touch of the image for display by the first detection unit 614 is an example of the detection of an operator's selection of an image for display by the first detection unit 614.

The display control unit 613 displays a screen for drawing on the display device 11 in response to the first detection unit 614 detecting the selection of an image for display (ACT13). In ACT13, for example, the display control unit 613 displays the screen for drawing SCb (see FIG. 5) for inputting an image quality abnormality with respect to a target image corresponding to the selected image for display on the display device 11. Thereby, the display device 11 displays the screen for drawing SCb under the control of the display control unit 613.

The second detection unit 615 detects an input to a drawing region of drawing indicating an image quality abnormality with respect to the target image corresponding to the selected image for display (ACT14). In ACT14, for example, the second detection unit 615 detects an operator's touch input to the display device 11 through the input device 12 for drawing an image quality abnormality with respect to the target image. The second detection unit 615 can also detect a touch input related to drawing indicating a plurality of image abnormalities with respect to one target image. The drawing indicating the plurality of image abnormalities may be a drawing using the same drawing tool or may be drawing using different drawing tools. The second detection unit 615 detects the position and trajectory of the operator's touch on a drawing region with respect to a drawing indicating each of the image quality abnormalities. The detection of the touch position and the trajectory on the drawing region by the second detection unit 615 is an example of the detection of an input to a drawing region of drawing indicating an image quality abnormality. The second detection unit 615 detects that drawing indicating one or more image quality abnormalities is input in accordance with a signal transmitted from the input device 12. The second detection unit 615 acquires drawing information based on drawing indicating one or more image quality abnormalities.

The storage control unit 612 stores drawing information based on drawing indicating an image quality abnormality detected by the second detection unit 615 in the storage 63. The storage control unit 612 stores the drawing information in the storage 63 in correlation with image data corresponding to a target image. The storage control unit 612 stores drawing information in the storage 63 whenever an operator's drawing is detected. The drawing information may be appropriately updated.

The first detection unit 614 detects an output instruction for outputting the operator's drawing information to the management server 3 (ACT15). In ACT15, for example, the first detection unit 614 detects the operator's touch input of the "send" button Ba through the input device 12. The detection of the touch input of the "send" button Ba by the first detection unit 614 is an example of a touch input of the "send" button Ba. For example, the first detection unit 614 detects a touch input of the "send" button Ba in accordance with a signal transmitted from the input device 12.

On the other hand, the first detection unit 614 detects the operator's display instruction for displaying the target image selection screen SCa on the display device 11. For example, the first detection unit 614 detects the operator's touch input of the "return" button Bb through the input device 12 as an example of a display instruction. The detection of the touch input of the "return" button Bb by the first detection unit 614 is an example of a touch input of the "return" button Bb.

For example, the first detection unit 614 detects that the touch input of the "return" button Bb is performed in accordance with a signal transmitted from the input device 12. In this case, the display control unit 613 displays the target image selection screen SCa on the display device 11 in response to the first detection unit 614 detecting the touch input of the "return" button Bb. According to this example, the operator can operate the "return" button Bb to input an image quality abnormality with respect to a plurality of target images before the image forming apparatus 1 outputs drawing information to the management server 3.

When an output instruction is detected by the first detection unit 614 (ACT15: YES), the processing transitions from ACT15 to ACT16. When an output instruction is not detected by the first detection unit 614 (ACT15: NO), the processing transitions from ACT15 to ACT11. Not detecting output instruction by the first detection unit 614 is equivalent to the detection of a touch input of the "return" button Bb by the first detection unit 614.

The output unit 619 outputs various information to the management server 3 through the network 2 (ACT16). In ACT16, for example, the first acquisition unit 616 acquires drawing information from the storage 63. The output unit 619 outputs the drawing information acquired by the first acquisition unit 616 to the management server 3. The communication circuit 70 outputs the drawing information to the management server 3.

According to this example, the output unit 619 can output drawing information correlated with a target image in which an image quality abnormality occurs to the management server 3. For this reason, a service man receiving the drawing information can specify the type of image quality abnormality and the cause of occurrence on the basis of the drawing information. Thereby, the image forming apparatus 1 does not need to output image data of a target image read from a medium having the target image formed thereon. The image forming apparatus 1 can provide notice of the state of an image quality abnormality in consideration of security. In addition, the image forming apparatus 1 can reduce communication capacity as compared with a case where image data of a target image read from a medium having the target image formed thereon is output.

The output unit 619 may collectively output pieces of drawing information with respect to a plurality of target images corresponding to a plurality of images for display selected in the same job.

According to this example, the output unit 619 can collectively output pieces of drawing information with respect to a plurality of target images for each job. Thereby, the image forming apparatus 1 can reduce processing steps as compared with a case where output processing is performed for each target image.

In another example, the output unit 619 may output at least one of feature information, setting information, or estimation abnormality information to the management server 3 in addition to drawing information.

Hereinafter, a case where the output unit 619 outputs feature information to the management server 3 in addition to drawing information will be described.

The second acquisition unit 617 acquires feature information with respect to a target image corresponding to an image for display selected by an operator from the storage 63. The feature information with respect to the target image is information based on input image data of the target image. The second acquisition unit 617 may acquire feature information for each of sub-regions obtained by dividing a target image in a grid shape. The output unit 619 may output the feature information acquired by the second acquisition unit 617 to the management server 3 in addition to drawing information. The communication circuit 70 outputs the feature information to the management server 3.

According to this example, the output unit 619 can output feature information correlated with a target image in which an image quality abnormality occurs to the management server 3. For this reason, a service person receiving feature information in addition to drawing information can specify the type of image quality abnormality and the cause of occurrence in more detail on the basis of the feature information and the drawing information. The service person can specify the type of image quality abnormality and the cause of occurrence in more detail with reference to feature information of a sub-region corresponding to a drawn region.

In addition, when a plurality of target images are selected in the same job by an operator, the second acquisition unit 617 acquires feature information with respect to the plurality of target images from the storage 63. The output unit 619 outputs drawing information with respect to a plurality of target images corresponding to a plurality of images for display selected in the same job in correlation with the feature information with respect to the plurality of target images. The communication circuit 70 outputs drawing information with respect to a plurality of target images to the management server 3 in correlation with the feature information with respect to the plurality of target images.

According to this example, the output unit 619 can collectively output pieces of feature information with respect to a plurality of target images for each job. Thereby, the image forming apparatus 1 can reduce processing steps as compared with a case where output processing is performed for each target image.

In addition, the second acquisition unit 617 may further acquire feature information with respect to one or more other images different from a target image corresponding to an image for display selected by an operator. The feature information with respect to one or more other images is information based on image data of one or more other images formed on a medium by the printer unit 40 prior to the target image. One or more other images may be images in the same job as the job of the target image. In this case, the second acquisition unit 617 acquires feature information with respect to one or more other images among the images in the same job as the job of the target image. The output unit 619 outputs the feature information with respect to one or more other images to the management server 3 in addition to the feature information with respect to the target image. The communication circuit 70 outputs the feature information with respect to one or more other images to the management server 3.

According to this example, the output unit 619 can output not only feature information correlated with a target image but also feature information correlated with one or more other images to the management server 3. For this reason, a service person can specify the type of image quality abnormality and the cause of occurrence in more detail on the basis of transitions of the feature information of one or more other images and the target image. Since one or more other images are included in the same job as the target image, the feature information of one or more other images has continuity with the feature information of the target image, which more contributes to the specification of the type of image quality abnormality and the cause of occurrence.

Next, a case where the output unit 619 outputs setting information to the management server 3 in addition to drawing information is described.

The second acquisition unit 617 acquires setting information related to the formation of a target image on a medium by the printer unit 40 from the storage 63. The output unit 619 outputs the setting information acquired by the second acquisition unit 617 to the management server 3 in addition to drawing information. The communication circuit 70 outputs the setting information to the management server 3.

According to this example, the output unit 619 can output setting information correlated with a target image in which an image quality abnormality occurs to the management server 3. For this reason, a service person receiving the setting information in addition to drawing information can specify the type of image quality abnormality and the cause of occurrence in more detail on the basis of the setting information and the drawing information at the time of printing the target image.

In addition, the second acquisition unit 617 may further acquire setting information with respect to one or more other images different from a target image, similar to an example of feature information. The one or more other images may be images in the same job as the job of the target image. In this case, the second acquisition unit 617 acquires setting information with respect to one or more other images among the images in the same job as the job of the target image. The output unit 619 outputs setting information with respect to one or more other images to the management server 3 in addition to setting information with respect to a target image. The communication circuit 70 outputs the setting information with respect to one or more other images to the management server 3.

According to this example, the output unit 619 can output not only setting information correlated with a target image but also setting information correlated with one or more other images to the management server 3. For this reason, a service person can specify the type of image quality abnormality and the cause of occurrence in more detail on the basis of transitions of the setting information of one or more other images and the target image. Since one or more other images are included in the same job as the target image, the setting information of one or more other images has continuity with the setting information of the target image, which more contributes to the specification of the type of image quality abnormality and the cause of occurrence.

Next, a case where the output unit 619 outputs estimation abnormality information to the management server 3 in addition to drawing information will be described.

The second acquisition unit 617 acquires estimation abnormality information corresponding to an image for display selected by an operator from the storage 63. The output unit 619 outputs the estimation abnormality information acquired by the second acquisition unit 617 to the management server in addition to drawing information. The communication circuit 70 outputs the estimation abnormality information to the management server 3.

According to this example, the output unit 619 can output estimation abnormality information based on drawing information to the management server 3. For this reason, a service person receiving the estimation abnormality information in addition to the drawing information can easily specify the type of image quality abnormality and the cause of occurrence on the basis of the estimation abnormality information.

Meanwhile, when at least one sub-region is selected by an operator in the screen for drawing SCb, the output unit 619 may output sub-region selection information to the management server 3. The sub-region selection information is information indicating a selected sub-region. The communication circuit outputs the sub-region selection information to the management server 3. In this case, the screen for drawing SCb may include a sub-region selection button for giving an instruction for selecting a sub-region. The operator performs a touch input on the sub-region selection button and touches a sub-region including a position where an image quality abnormality occurs to select the sub-region. The first detection unit 614 detects the touch input on the sub-region selection button and the touch input on the sub-region which are performed by the operator. The first detection unit 614 detects that the sub-region selection button and the sub-region are touched in accordance with a signal transmitted from the display device 11. The output unit 619 outputs the sub-region selection information to the management server 3 on the basis of the selection of a sub-region detected by the first detection unit 614.

According to this example, the output unit 619 can output sub-region selection information indicating a selected sub-region to the management server 3. For this reason, a service person can easily specify a position where an image quality abnormality occurs in a target image.

Meanwhile, the output unit 619 may output image data of a target image to the management server 3. The communication circuit 70 outputs image data of a target image to the management server 3. In this case, the screen for drawing SCb may include a transmission selection button for selecting whether or not to transmit image data. The transmission selection button is, for example, a button for giving an instruction for outputting image data to the management server 3. An operator performs a touch input on the transmission selection button and gives an instruction for transmitting image data. The first detection unit 614 detects the operator's touch input of the transmission selection button. The first detection unit 614 detects that the transmission selection button is touched in accordance with a signal transmitted from the display device 11. The output unit 619 outputs image data of a target image to the management server 3 on the basis of an output instruction detected by the first detection unit 614.

According to this example, the output unit 619 can output image data to the management server 3 in accordance with the selection of an operator. For this reason, a service person can easily specify the type of image quality abnormality on the basis of the image data.

The image forming apparatus 1 may be realized by one apparatus as described in the above-described example, or may be realized by a system in which functions are distributed to a plurality of apparatuses.

Meanwhile, the transfer of an apparatus is generally performed in a state where a program is stored in a main memory or an auxiliary storage device. However, the embodiments are not limited to this, and the transfer of an apparatus may be performed in a state where a program is not stored in a main memory or an auxiliary storage device. Further, in this case, a program transferred separately from this apparatus is written in a writable storage device included in the apparatus in accordance with an operation of a user or the like. The transfer of a program can be performed by being recorded in a removable recording medium or by communication through a network. The recording medium is a non-transitory tangible medium. The recording medium is a computer-readable medium. The form of the recording medium does not matter as long as the recording medium can store programs such as a CD-ROM or a memory card and can be read by an apparatus. In addition, functions obtained by installing or downloading programs may be realized in cooperation with an operating system (OS) or the like inside an apparatus.

While certain embodiments have been described, these embodiments have been presented by way of example only, and are not intended to limit the scope of the disclosure. Indeed, the novel embodiment described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus comprising:
a display device configured to display at least one image for display;
an input device configured to:
detect a selection by a user of an image for display in the at least one image for display, and
detect an input, to a drawing region of the display device, of a drawing by a user indicating an image quality abnormality with respect to a target image corresponding to the selected image for display;
a storage configured to:
store drawing information based on the input of the drawing detected via the input device, and
store estimation abnormality information related to the drawing information; and
a communication circuit configured to output the drawing information, which can be used for servicing the image forming apparatus, to a server.

2. The apparatus according to claim 1, wherein:
the storage is further configured to store feature information with respect to the target image based on image data of the target image; and
the communication circuit is further configured to output the feature information, which can be used for servicing the image forming apparatus, to the server.

3. The apparatus according to claim 2, wherein
the feature information includes feature information for each of regions obtained by dividing the target image in a grid shape.

4. The apparatus according to claim 2, wherein:
the storage is further configured to store feature information with respect to one or more other images based on image data of the one or more other images, the one or more other images being formed on a medium by a printer prior to the target image; and
the communication circuit is further configured to output the feature information with respect to the one or more other images, which can be used for servicing the image forming apparatus, to the server.

5. The apparatus according to claim 4, wherein
the one or more other images are images in a same job as a job of the target image.

6. The apparatus according to claim 5, wherein
the communication circuit is further configured to output drawing information with respect to a plurality of target images corresponding to a plurality of images for display selected in the same job, which can be used for servicing the image forming apparatus, in correlation with the feature information with respect to the plurality of target images, to the server.

7. The apparatus according to claim 2, wherein
the communication circuit is further configured to output drawing information with respect to a plurality of target images corresponding to a plurality of images for display selected in a same job, which can be used for servicing the image forming apparatus, in correlation with the feature information with respect to the plurality of target images, to the server.

8. The apparatus according to claim 1, wherein:
the storage is further configured to store setting information related to formation of the target image on a medium by a printer; and
the communication circuit is further configured to output the setting information, which can be used for servicing the image forming apparatus, to the server.

9. The apparatus according to claim 8, wherein:
the storage is further configured to store setting information with respect to one or more other images based on image data of the one or more other images, the one or more other images being formed on a medium by the printer prior to the target image; and
the communication circuit is further configured to output the setting information with respect to the one or more other images, which can be used for servicing the image forming apparatus, to the server.

10. The apparatus according to claim 9, wherein
the one or more other images are images in a same job as a job of the target image.

11. The apparatus according to claim 10, wherein
the communication circuit is further configured to output drawing information with respect to a plurality of target images corresponding to a plurality of images for display selected in the same job, which can be used for servicing the image forming apparatus, in correlation with the setting information with respect to the plurality of target images, to the server.

12. The apparatus according to claim 1, wherein
the display device is further configured to display a plurality of drawing tools for inputting the drawing by a user indicating an image quality abnormality.

13. The apparatus according to claim 1, wherein
the display device is further configured to display the selected image for display in the drawing region.

14. An image forming apparatus comprising:
a display device configured to display at least one image for display;
an input device configured to:
detect a selection by a user of an image for display in the at least one image for display, and
detect an input, to a drawing region of the display device, of a drawing by a user indicating an image quality abnormality with respect to a target image corresponding to the selected image for display;
a storage configured to store drawing information based on the input of the drawing detected via the input device; and
a communication circuit configured to output the drawing information, which can be used for servicing the image forming apparatus, to a server.

15. The image forming apparatus according to claim 14, wherein:
the storage is further configured to store feature information with respect to the target image based on image data of the target image; and
the communication circuit is further configured to output the feature information, which can be used for servicing the image forming apparatus, to a server.

16. The image forming apparatus according to claim 15, wherein the feature information includes feature information for each of regions obtained by dividing the target image in a grid shape.

17. The image forming apparatus according to claim 14, wherein
   the storage is further configured to store setting information related to formation of the target image on a medium by a printer; and
   the communication circuit is further configured to output the setting information, which can be used for servicing the image forming apparatus, to a server.

18. The image forming apparatus according to claim 17, wherein
   the storage is further configured to store setting information with respect to one or more other images based on image data of the one or more other images, the one or more other images being formed on a medium by the printer prior to the target image; and
   the communication circuit is further configured to output the setting information with respect to the one or more other images, which can be used for servicing the image forming apparatus, to a server.

19. The image forming apparatus according to claim 18, wherein
   the one or more other images are images in a same job as a job of the target image.

* * * * *